(12) United States Patent
Kim et al.

(10) Patent No.: US 12,531,289 B2
(45) Date of Patent: Jan. 20, 2026

(54) VEHICLE BATTERY PACK AND VEHICLE BATTERY PACK SYSTEM HAVING THE SAME

(71) Applicant: SK On Co., Ltd., Seoul (KR)

(72) Inventors: Se Hyeon Kim, Daejeon (KR); Sol San Son, Daejeon (KR); Seung Hun Lee, Daejeon (KR); So Yeon Choi, Daejeon (KR); Jin Su Han, Daejeon (KR)

(73) Assignee: SK On Co., Ltd., Seoul (KR)

( * ) Notice: Subject to any disclaimer, the term of this patent is extended or adjusted under 35 U.S.C. 154(b) by 63 days.

(21) Appl. No.: 18/625,219

(22) Filed: Apr. 3, 2024

(65) Prior Publication Data
US 2024/0363917 A1    Oct. 31, 2024

(30) Foreign Application Priority Data
Apr. 25, 2023    (KR) .................. 10-2023-0054029

(51) Int. Cl.
| | |
|---|---|
| *H01M 10/63* | (2014.01) |
| *B60R 16/033* | (2006.01) |
| *H01M 10/48* | (2006.01) |
| *H01M 10/613* | (2014.01) |
| *H01M 10/625* | (2014.01) |
| *H01M 50/204* | (2021.01) |
| *H02J 7/00* | (2006.01) |

(52) U.S. Cl.
CPC ........... *H01M 10/63* (2015.04); *B60R 16/033* (2013.01); *H01M 10/482* (2013.01); *H01M 10/486* (2013.01); *H01M 10/613* (2015.04); *H01M 10/625* (2015.04); *H01M 50/204* (2021.01); *H02J 7/0013* (2013.01); *H02J 7/0029* (2013.01); *H01M 2220/20* (2013.01)

(58) Field of Classification Search
CPC .. H01M 10/63; H01M 10/613; H01M 10/625; H01M 50/204; H01M 10/482; H01M 10/486; H01M 220/20; H02J 7/0013; H02J 7/0029
USPC ........................................ 307/9.1, 10.1, 10.6
See application file for complete search history.

(56) References Cited

U.S. PATENT DOCUMENTS

| | | | |
|---|---|---|---|
| 12,294,067 B2 * | 5/2025 | Chen ................. | B60L 58/26 |
| 2014/0306519 A1 * | 10/2014 | Song ................. | B60L 58/22 |
| | | | 320/134 |
| 2022/0021090 A1 * | 1/2022 | Shin ................. | H01M 50/581 |

FOREIGN PATENT DOCUMENTS

| | | |
|---|---|---|
| JP | 2015-089170 A | 5/2015 |
| KR | 10-2020-0141425 A | 12/2020 |
| KR | 10-2021-0017842 A | 2/2021 |

* cited by examiner

*Primary Examiner* — Michael R. Fin
(74) *Attorney, Agent, or Firm* — IP & T GROUP LLP

(57) ABSTRACT

A vehicle battery pack may include: a first battery portion including a first battery module; a second battery portion including a second battery module; a connector supplying power from at least one of the first battery portion and the second battery portion when no battery abnormality has occurred to a thermal management control unit; a bypass path unit providing a path to bypass any one of the first battery portion and the second battery portion when a battery abnormality has occurred; and a switching unit connecting the bypass path unit to the first or second battery portion when the battery abnormality has occurred, in a power supply circuit including the first battery portion and the second battery portion, connected to the connector, to supply power to the thermal management control unit.

19 Claims, 13 Drawing Sheets

VEHICLE BATTERY PACK AND VEHICLE BATTERY PACK SYSTEM HAVING THE SAME

CROSS-REFERENCE TO RELATED APPLICATION(S)

This application claims benefit of priority to Korean Patent Application No. 10-2023-0054029 filed on Apr. 25, 2023 in the Korean Intellectual Property Office, the disclosure of which is incorporated herein by reference in its entirety.

BACKGROUND

1. Field

The present disclosure relates to a vehicle battery pack and a vehicle battery pack system having the same.

2. Description of Related Art

In general, a battery used as a power source for an electric vehicle (EV), an energy storage system, or the like may have a form of a battery pack. This battery pack may include a plurality of battery modules, and each of the plurality of battery modules may include a plurality of battery cells.

The battery may be applied to an electric vehicle or the like, and may include a battery management system (BMS) including a circuit for managing the charging and discharging of the battery.

In recent years, there has been increasing demand for a high-energy battery to improve a driving distance of the electric vehicle (EV). In response to this demand, not only research and development on the cathode material and anode material of the battery, and battery stability are being actively conducted, but also interest in a used battery and a waste battery is gradually increasing.

Meanwhile, in an existing battery device, thermal runaway may occur due to a rapid temperature increase in the battery cell by a rapid heat occurrence reaction caused by an instantaneous high current when the cathode and the anode come into contact with each other for a certain reason in the battery cell disposed in the battery module.

Accordingly, there is need for the existing battery device to have a measure provided to prevent a thermal spread at a battery module level or a battery pack level when battery abnormality such as a cell thermal runaway occurs.

However, when the battery has a thermal runaway occurrence while the battery has a high state of charge (SOC), a gas and a reaction heat, occurring in the battery cell, may be greater than those when the battery has a low SOC. Therefore, it is difficult to control a thermal runaway of the battery pack in which the battery cell is packaged when the SOC remains high and thermal runaway occurs.

In addition, when fire occurs in one of the plurality of battery cells included in the battery module, it may take time for the fire to spread to a neighboring battery cell or an adjacent battery module. However, power for battery cooling cannot be supplied due to lack of an appropriate measure. As a result, the battery cooling cannot be performed, which may increase a fire risk and a damage level.

SUMMARY

An aspect of the present disclosure may provide a vehicle battery pack which may stably supply power for battery cooling by allowing a power path for supplying power to a cooling device to bypass a corresponding battery portion determined to have battery abnormality when the battery abnormality such as a high temperature is determined to occur in any one of at least two battery portions including at least one battery module, and a vehicle battery pack system having the same.

The technical problems to be solved by the present disclosure are not limited to the above-mentioned problems, and any other technical problems, not mentioned herein, will be clearly understood from the following description by those skilled in the art to which the present disclosure pertains.

According to an aspect of the present disclosure, a vehicle battery pack may include: a first battery portion including a first battery module; a second battery portion including a second battery module; a connector supplying power from at least one of the first battery portion and the second battery portion when no battery abnormality has occurred to a thermal management control unit; a bypass path unit providing a path to bypass any one of the first battery portion and the second battery portion when a battery abnormality has occurred; and a switching unit connecting the bypass path unit to the first or second battery portion when the battery abnormality has occurred, in a power supply circuit including the first battery portion and the second battery portion, connected to the connector, to supply power to the thermal management control unit.

According to another aspect of the present disclosure, a vehicle battery pack system may include: a vehicle battery pack; a thermal management control unit receiving power through a connector of the vehicle battery pack and generating a driving voltage for cooling the vehicle battery pack; and a cooling device disposed on at least one side of the vehicle battery pack and operated by receiving the driving voltage from the thermal management control unit to cool the vehicle battery pack.

In addition, exemplary embodiments of the present disclosure are not limited to the exemplary embodiments exemplified above, and another exemplary embodiment may be further understood in a process described below.

BRIEF DESCRIPTION OF DRAWINGS

The above and other aspects, features and advantages of the present disclosure will be more clearly understood from the following detailed description taken in conjunction with the accompanying drawings, in which.

The same reference numerals denote the same components throughout the accompanying drawings and the detailed description. The drawings are not drawn to scale, and the relative sizes, proportions and depictions of drawing elements may be exaggerated for clarity, description and convenience.

DETAILED DESCRIPTION

Hereinafter, exemplary embodiments of the present disclosure will now be described in detail with reference to the accompanying drawings.

Figure 1:
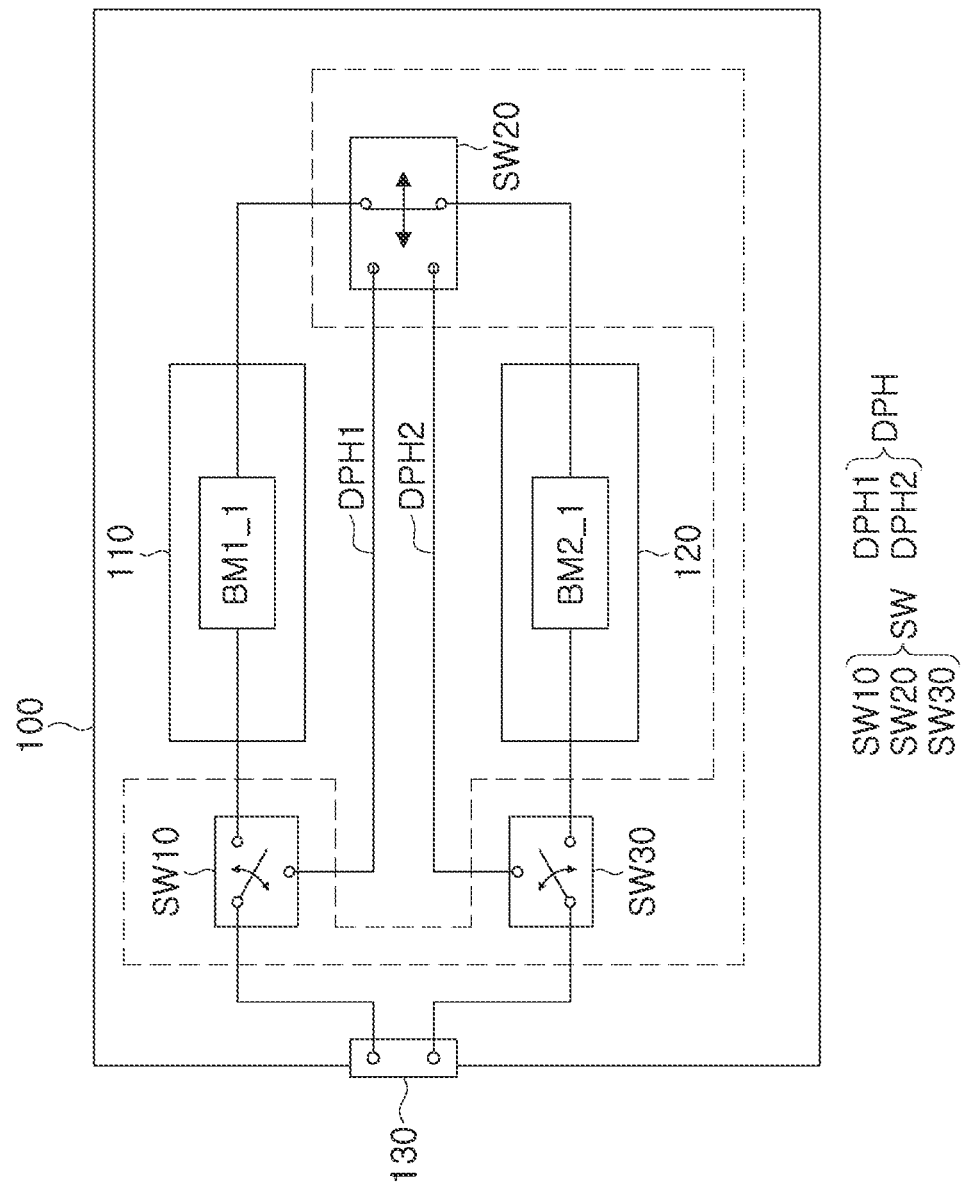
FIG. 1 is an exemplary view illustrating an internal configuration of a vehicle battery pack according to an exemplary embodiment of the present disclosure.

FIG. 1 is an exemplary view illustrating an internal configuration of a vehicle battery pack according to an exemplary embodiment of the present disclosure.

Referring to FIG. 1, a vehicle battery pack 100 according to an exemplary embodiment of the present disclosure may include a first battery portion 110, a second battery portion 120, a connector 130, a bypass path unit DPH, and a switching unit SW.

The first battery portion 110 may include at least one first battery module BM1_1. The second battery portion 120 may include at least one second battery module BM2_1. The connector 130 may supply power from at least one of the first battery portion 110 and the second battery portion 120 when no battery abnormality has occurred to a thermal management control unit 200 (in FIG. 3) to cool a battery device. The bypass path unit DPH may provide a path to bypass any one of the first battery portion 110 and the second battery portion 120 when a battery abnormality has occurred. In addition, the switching unit SW may connect the bypass path unit DPH to the first or second battery portion 110 or 120 when the battery abnormality has occurred, in a power supply circuit including the first battery portion 110 and the second battery portion 120, connected to the connector 130, to supply power to the thermal management control unit.

For the respective drawings of the present disclosure, unnecessary redundant descriptions of components having the same reference numeral and the same function may be omitted, and possible differences between the respective drawings are described.

Figure 2:
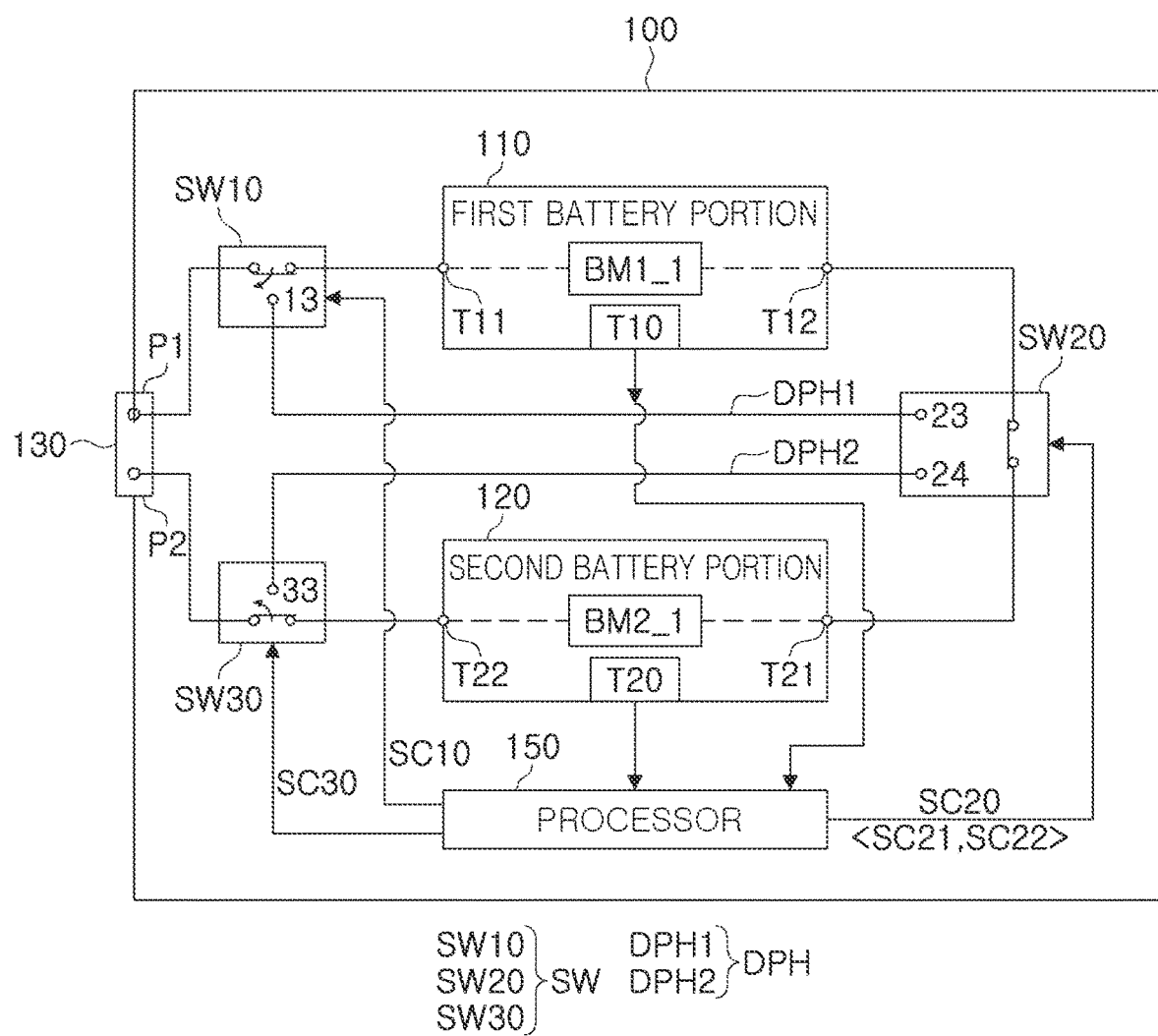
FIG. 2 is an exemplary view illustrating an internal configuration of the vehicle battery pack.

FIG. 2 is an exemplary view illustrating an internal configuration of the vehicle battery pack.

Referring to FIG. 2, the vehicle battery pack 100 according to an exemplary embodiment of the present disclosure may include the first battery portion 110, the second battery portion 120, the connector 130, the bypass path unit DPH, the switching unit SW, and a processor 150.

Figure 3:
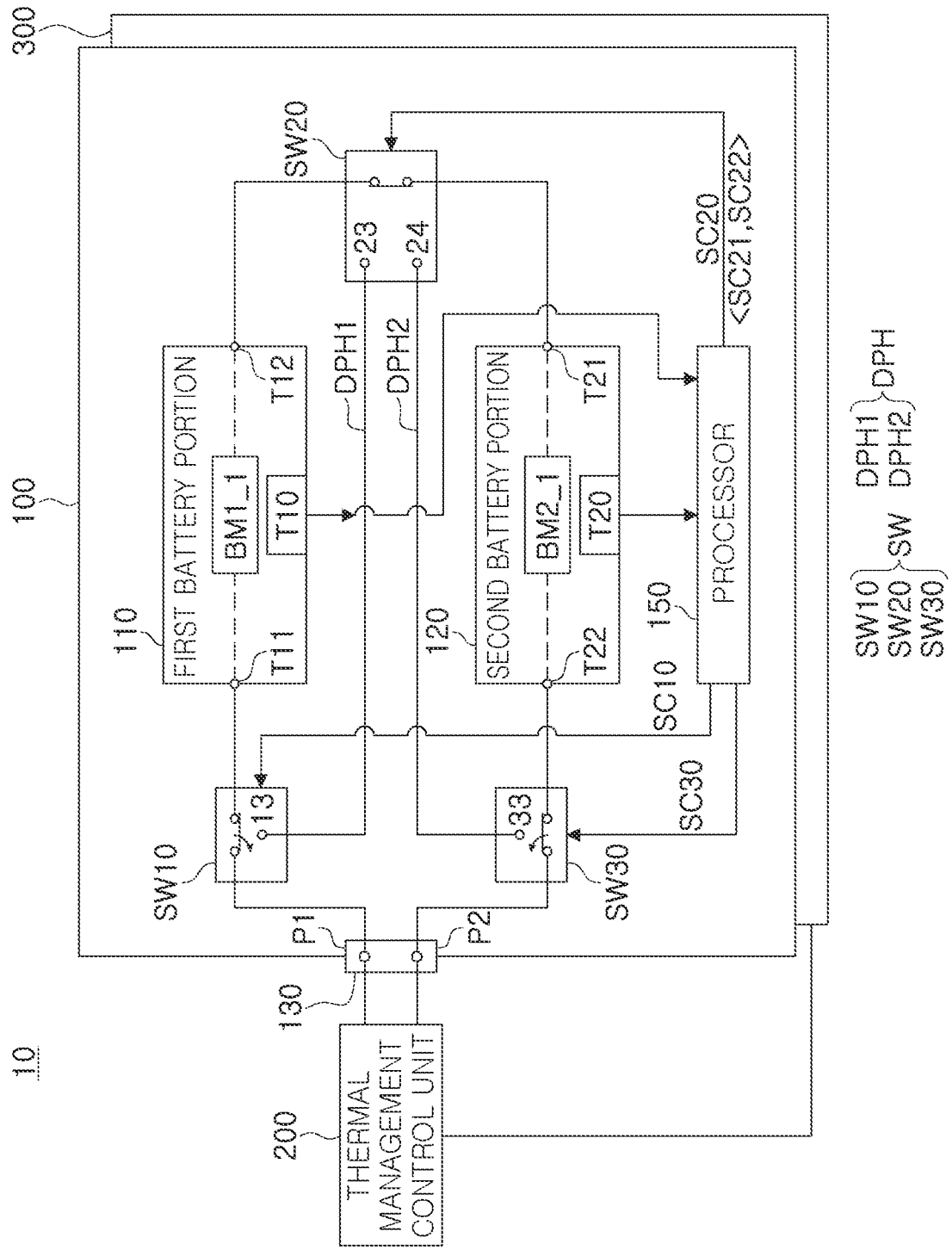
FIG. 3 is an exemplary view illustrating an internal configuration of a vehicle battery pack system according to an exemplary embodiment of the present disclosure.

FIG. 3 is an exemplary view illustrating an internal configuration of a vehicle battery pack system according to an exemplary embodiment of the present disclosure.

Referring to FIG. 3, a vehicle battery pack system 10 according to another exemplary embodiment of the present disclosure may include the vehicle battery pack 100, the thermal management control unit 200, and a cooling device 300.

The vehicle battery pack 100 may include the first battery portion 110, the second battery portion 120, the connector 130, the bypass path unit DPH, the switching unit SW, and the processor 150 as described above with reference to FIG. 2.

Referring to FIGS. 2 and 3, the first battery portion 110 may include a first temperature sensor unit T10 detecting a temperature of the first battery module BM1_1, and the second battery portion 120 may include a second temperature sensor unit T20 detecting a temperature of the second battery module BM2_1.

The bypass path unit DPH may include a first bypass path DPH1 and a second bypass path DPH2. The first bypass path DPH1 may provide a path to bypass the first battery portion 110, and the second bypass path DPH2 may provide a path to bypass the second battery portion 120.

In detail, the first battery portion 110 may include at least one first battery module BM1_1 and the first temperature sensor unit T10 detecting the temperature of the first battery module BM1_1. For example, the first battery portion 110 may include one first battery module BM1_1 (see FIG. 4), or include a plurality of first battery modules BM1_1 to BM1_$n$ (see FIG. 5) (here, n is a natural number of 2 or more).

The second battery portion 120 may include at least one second battery module BM2_1 and the second temperature sensor unit T20 detecting the temperature of the second battery module BM2_1. For example, the second battery portion 120 may include one second battery module BM2_1 (see FIG. 5), or include a plurality of second battery modules BM2_1 to BM m (here, m is a natural number of 2 or more and may be the same as or different from n).

For example, each of the first battery portion 110 and the second battery portion 120 may include at least one battery module or include the plurality of battery modules. In this case, the number of battery modules each included in the first battery portion 110 and the second battery portion 120 may be the same or different from each other.

For example, the connector 130 may include a first power terminal P1 and a second power terminal P2 for supplying power to the thermal management control unit 200. The first power terminal P1 may be connected to a first switch SW10, and the second power terminal P2 may be connected to a third switch SW30.

The switching unit SW may include the first switch SW10, a second switch SW20, and the third switch SW30.

The first switch SW10 may connect one end of the connector 130 to the first battery portion 110 or the first bypass path DPH1 based on control of the processor 150.

For example, based on the first control signal SC10, the first switch SW10 of the switching unit SW may connect a common terminal 11 (in FIG. 7) connected to the first power terminal P1 of the connector 130 to a terminal 12 (in FIG. 7) connected to the first battery portion 110 (e.g., when a first control signal SC10 is at a low level) or connect the common terminal 11 to a first bypass terminal 13 (e.g., when the first control signal SC10 is at a high level) connected to the first bypass path DPH1 (see FIGS. 10 through 13).

The first bypass path DPH1 of the bypass path unit DPH may provide a path to bypass the first battery portion 110 when the battery abnormality occurs in the first battery portion 110.

For example, the first bypass path DPH1 may have one end connected to the first bypass terminal 13 of the first switch SW10, and the other end connected to the second bypass terminal 23 of the second switch SW20.

Figure 11:
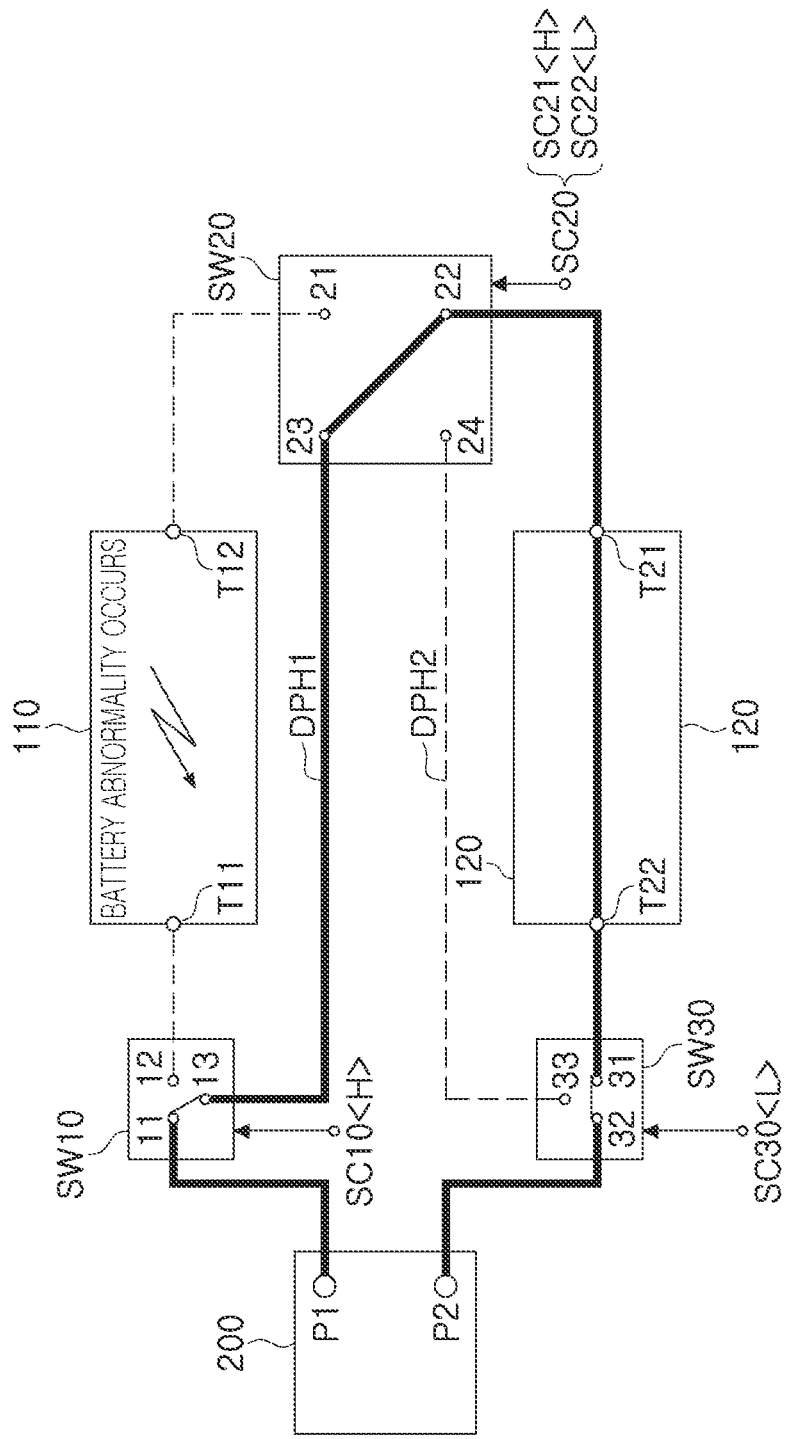
FIG. 11 is a view illustrating an operation of the vehicle battery pack when the battery abnormality occurs in the first battery portion.

For example, as shown in FIG. 11, the first bypass path DPH1 may provide the bypass path to bypass the first battery portion 110 by connecting the first switch SW10 to the second switch SW20 to supply power to the cooling device 300 without going through the first battery portion 110 when the battery abnormality occurs in the first battery portion 110.

The second bypass path DPH2 of the bypass path unit DPH may provide a path to bypass the second battery portion 120 when the battery abnormality occurs in the second battery portion 120.

For example, the second bypass path DPH2 may have one end connected to a third bypass terminal 24 of the second switch SW20, and the other end connected to a fourth bypass terminal 33 of the third switch SW30.

Figure 13:
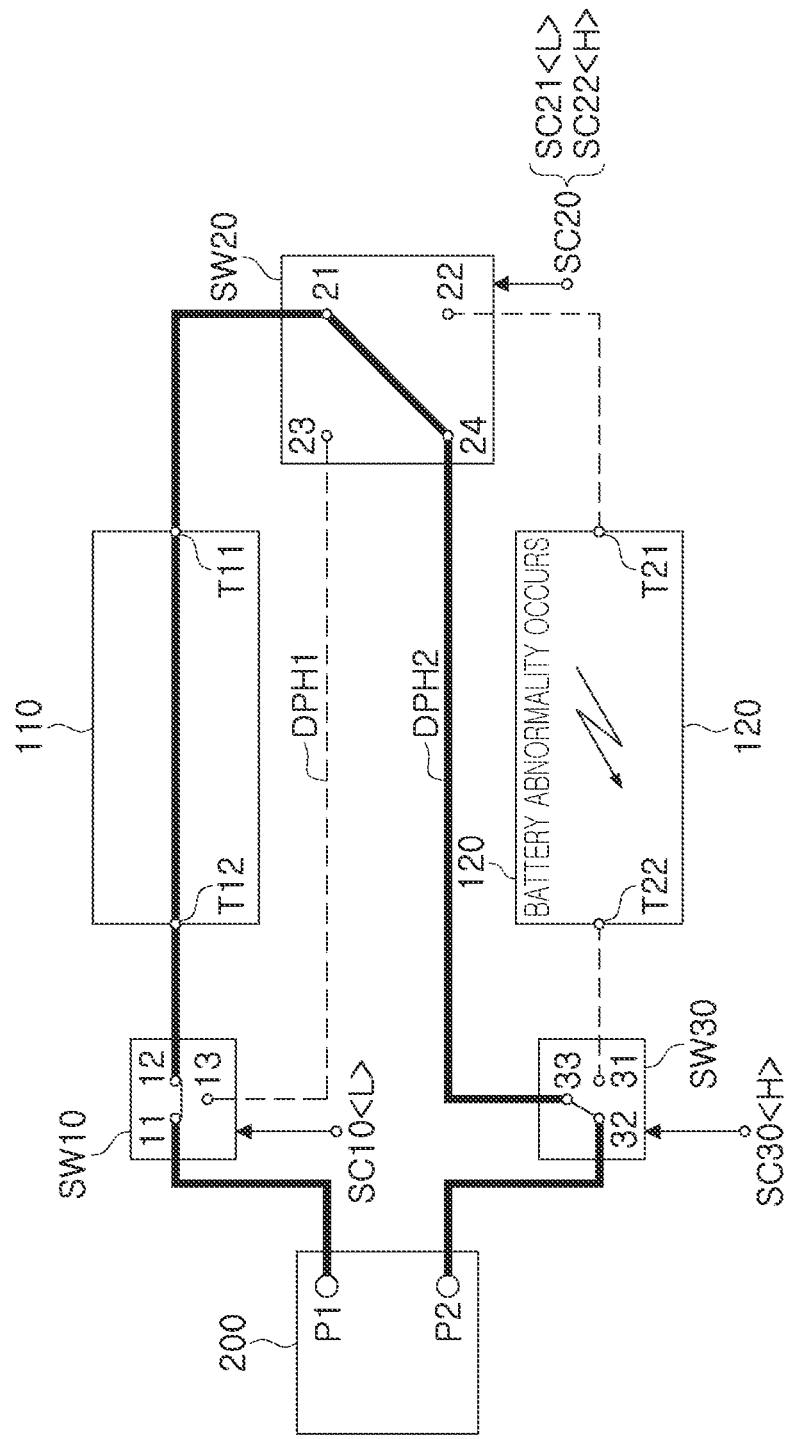
FIG. 13 is a view illustrating an operation of the vehicle battery pack when the battery abnormality occurs in the second battery portion.

For example, as shown in FIG. 13, the second bypass path DPH2 may provide the bypass path to bypass the second battery portion 120 by connecting the second switch SW20 to the third switch SW30 to supply power to the cooling device 300 without going through the second battery portion 120 when the battery abnormality occurs in the second battery portion 120.

Under the control of the processor 150, the second switch SW20 of the switching unit SW may connect the first battery portion 110 to the second battery portion 120 when no battery abnormality occurs, and connect the first battery portion 110 to the second bypass path DPH2, or connect the second battery portion 120 to the first bypass path DPH1, when the battery abnormality occurs.

For example, the second switch SW20 may connect a terminal 21 (in FIG. 7) connected to the first battery portion 110 to a terminal 22 (in FIG. 7) connected to the second battery portion 120 based on a second control signal SC20 when no battery abnormality occurs in each of the first battery portion 110 and the second battery portion 120. For example, the second switch SW20 may connect a second bypass terminal 23 connected to the other end of the first bypass path DPH1 to the terminal 22 (in FIG. 7) connected to the second battery portion 120 when the battery abnormality occurs in the first battery portion 110. For another example, the second switch SW20 may connect the third bypass terminal 24 connected to one end of the second bypass path DPH2 to the terminal 21 (in FIG. 7) connected to the first battery portion 110 when the battery abnormality occurs in the second battery portion 120.

The third switch SW30 of the switching unit SW may connect the other end of the connector 130 to the second battery portion 120 or the second bypass path DPH2 under the control of the processor 150.

For example, based on a third control signal SC30, the third switch SW30 may connect a common terminal 32 (in FIG. 7) connected to the second power terminal P2 of the connector 130 to a terminal 31 (in FIG. 7) connected to the second battery portion 120 (e.g., when the third control signal SC30 is at a low level), or connect the common terminal to the fourth bypass terminal 33 connected to the other end of the second bypass path DPH2 (e.g., when a fourth control signal SC40 is at a high level).

The processor 150 may provide the first control signal SC10, the second control signal SC20, and the third control signal SC30 to respectively control the first switch SW10, the second switch SW20, and the third switch SW30 to stably supply power for battery cooling even when the battery abnormality occurs.

In detail, the processor 150 may determine the battery abnormality of each of the first battery portion 110 and the second battery portion 120 based on a first sensing temperature ST10 from the first temperature sensor unit T10 and a second sensing temperature ST20 from the second temperature sensor unit T20, and may control the first switch SW10, the second switch SW20, and the third switch SW30 to bypass the first battery portion 110 or the second battery portion 120 when determining the battery abnormality occurs.

For example, when determining that the battery abnormality occurs in the first battery portion 110, the processor 150 may provide the first control signal SC10 to the first switch SW10 to thus control the first power terminal P1 of the connector 130 to be connected to the first bypass path DPH1, provide the second control signal SC20 to the second switch SW20 to thus control the first bypass path DPH1 to be connected to the second battery portion 120, and provide the third control signal SC30 to the third switch SW30 to thus control the second battery portion 120 to be connected to the second power terminal P2 of the connector 130.

For another example, when determining that the battery abnormality occurs in the second battery portion 120, the processor 150 may provide the first control signal SC10 to the first switch SW10 to thus control the first power terminal P1 of the connector 130 to be connected to the first battery portion 110, provide the second control signal SC20 to the second switch SW20 to thus control the first battery portion 110 to be connected to the second bypass path DPH2, and provide the third control signal SC30 to the third switch SW30 to thus control the second bypass path DPH2 to be connected to the second power terminal P2 of the connector 130.

Referring to FIG. 3, the thermal management control unit 200 may receive power through the connector 130 of the vehicle battery pack 100, and generate a driving voltage for cooling the vehicle battery pack 100 and supply the same to the cooling device 300.

The cooling device 300 may be disposed on at least one side (e.g., bottom) of the vehicle battery pack 100, and operated by receiving the driving voltage from the thermal management control unit 200 to cool the vehicle battery pack 100.

Figure 4:
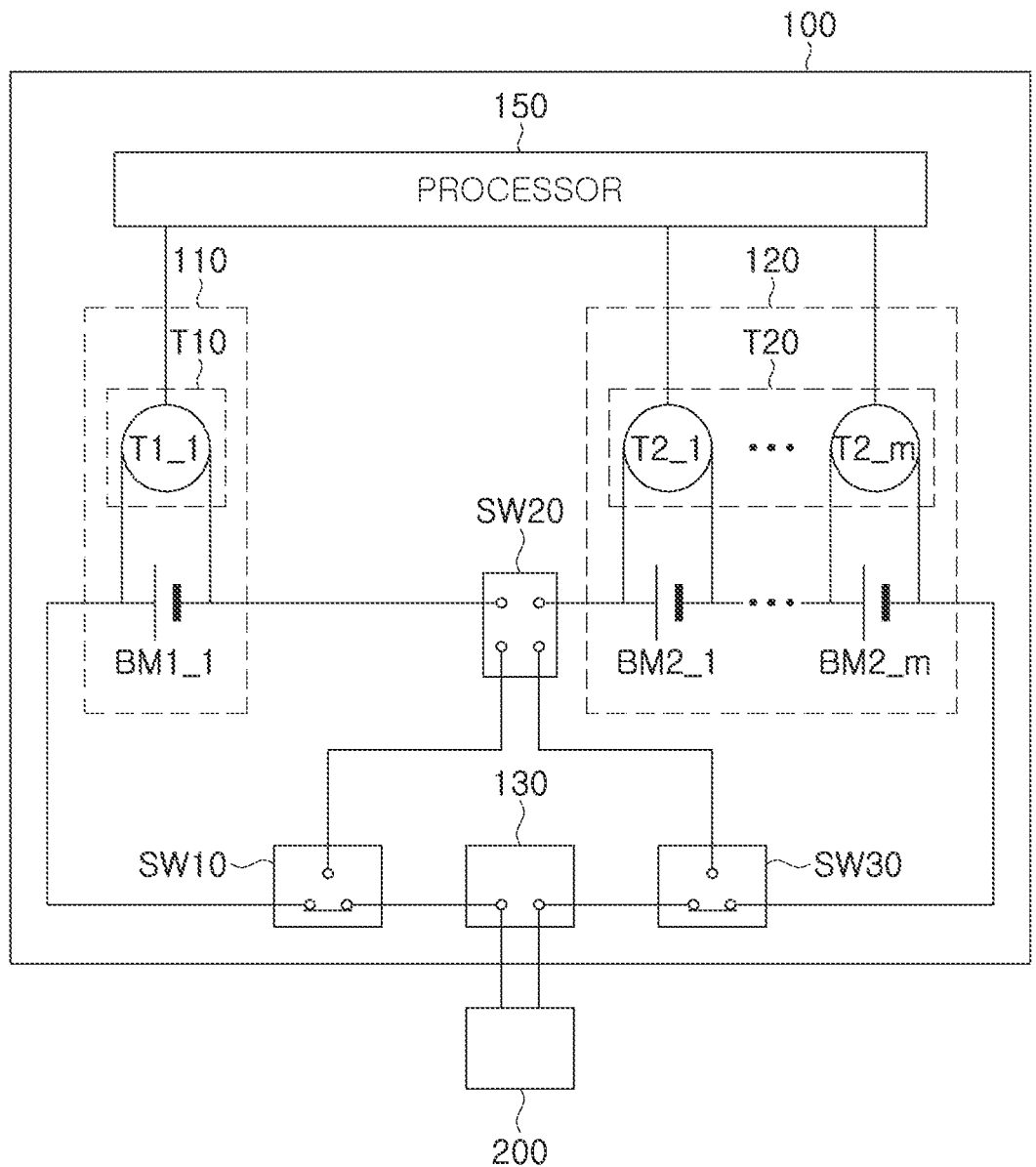
FIG. 4 is an exemplary configuration diagram of a first battery portion and a second battery portion.
Figure 5:
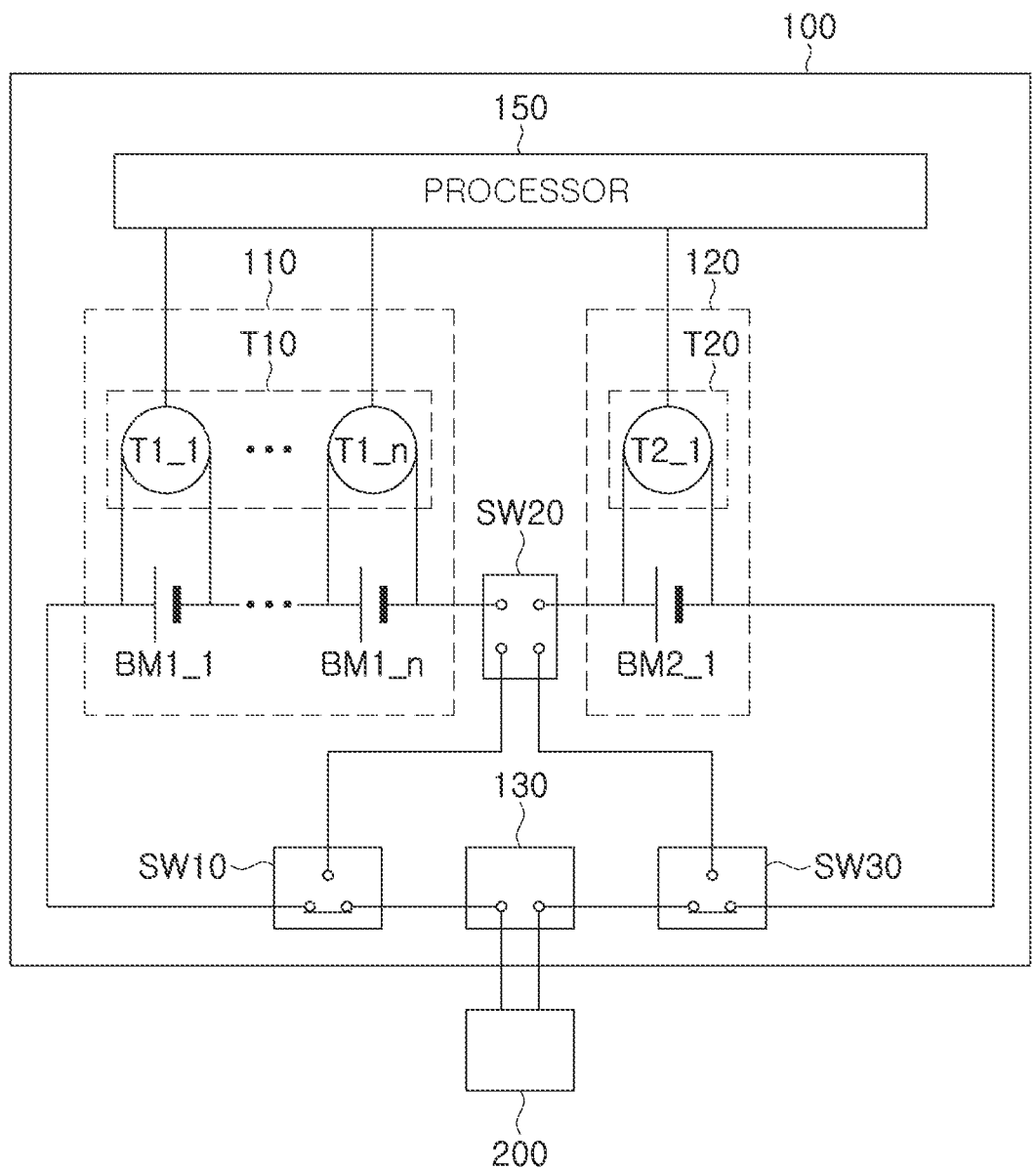
FIG. 5 is an exemplary configuration diagram of the first battery portion and the second battery portion.
Figure 6:
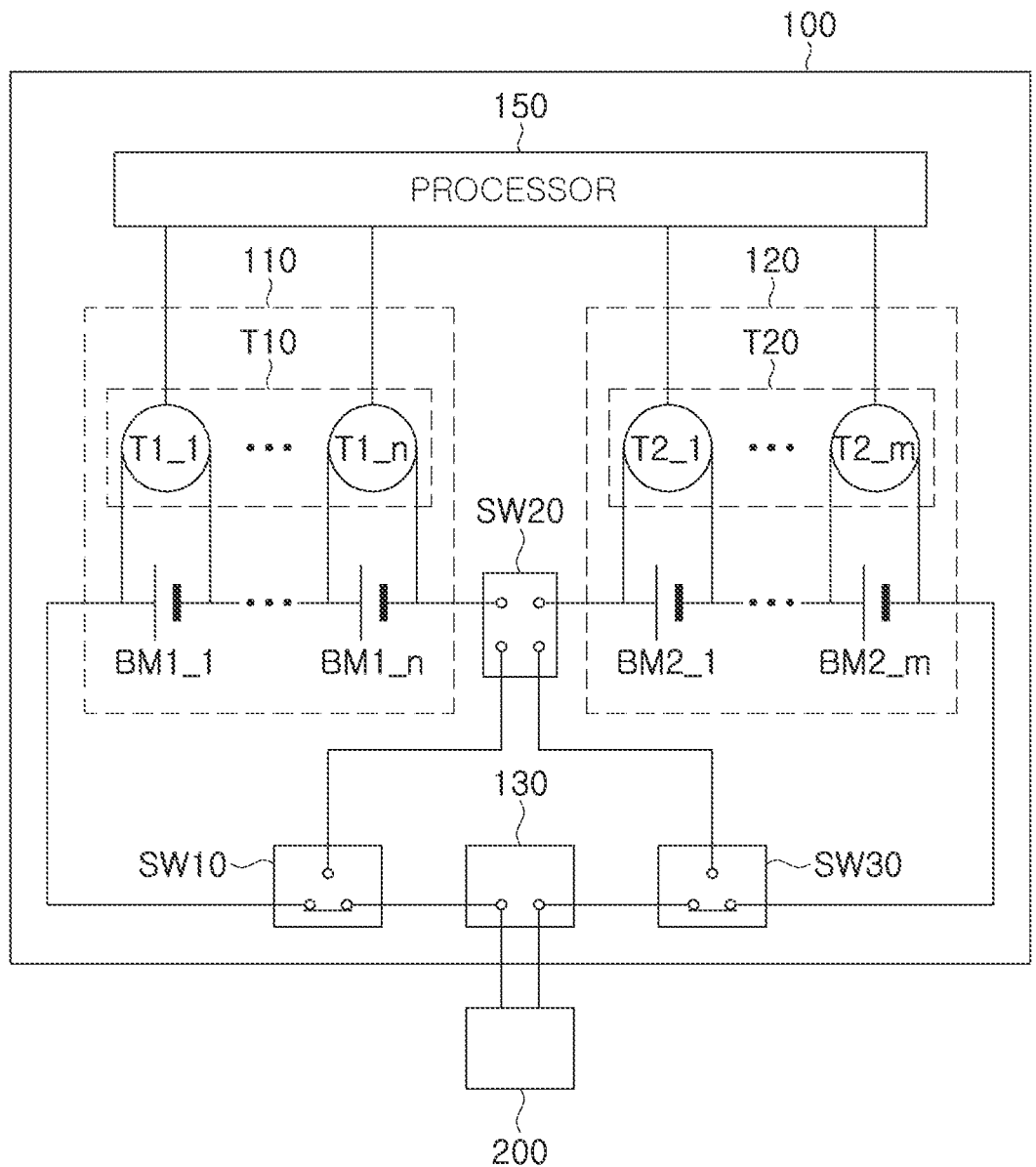
FIG. 6 is an exemplary configuration diagram of the first battery portion and the second battery portion.

FIG. 4 is an exemplary configuration diagram of the first battery portion and the second battery portion, and FIG. 5 is an exemplary configuration diagram of the first battery portion and the second battery portion. In addition, FIG. 6 is an exemplary configuration diagram of the first battery portion and the second battery portion.

Referring to FIG. 4, for example, the first battery portion 110 may include one first battery module BM1_1. In this case, the first temperature sensor unit T10 may include one temperature sensor T1_1 detecting a temperature of one first battery module BM1_1.

The second battery portion 120 may include a plurality of second battery modules BM2_1 to BM2_$m$ (here, m is a natural number of 2 or more). In this case, the second temperature sensor unit T20 may include a plurality of temperature sensors T2_1 to T2_$m$ detecting a temperature of each of the plurality of second battery modules BM2_1 to BM2_$m$.

Referring to FIG. 5, for example, the first battery portion 110 may include a plurality of first battery modules BM1_1 to BM1_$n$. In this case, the first temperature sensor unit T10 may include a plurality of temperature sensors T2_1 to T2_n respectively detecting temperatures of the plurality of first battery modules BM1_1 to BM1_n (here, n is a natural number of 2 or more, and n may be the same as or different from m).

The second battery portion 120 may include one second battery module BM2_1. In this case, the second temperature sensor unit T20 may include one temperature sensor T2_1 detecting a temperature of one second battery module BM2_1.

Referring to FIG. 6, for example, the first battery portion 110 may include the plurality of first battery modules BM1_1 to BM1_n. In this case, the first temperature sensor unit T10 may include the plurality of temperature sensors T2_1 to T2_n detecting the temperature of each of the plurality of first battery module BM1_1 to BM1_n.

The second battery portion 120 may include the plurality of second battery modules BM2_1 to BM2_m. In this case, the second temperature sensor unit T20 may include the plurality of temperature sensors T2_1 to T2_m respectively detecting temperatures of the plurality of second battery modules BM2_1 to BM2_m.

As described above, each of the first battery portion 110 and the second battery portion 120 may include one or more battery module.

Figure 7:
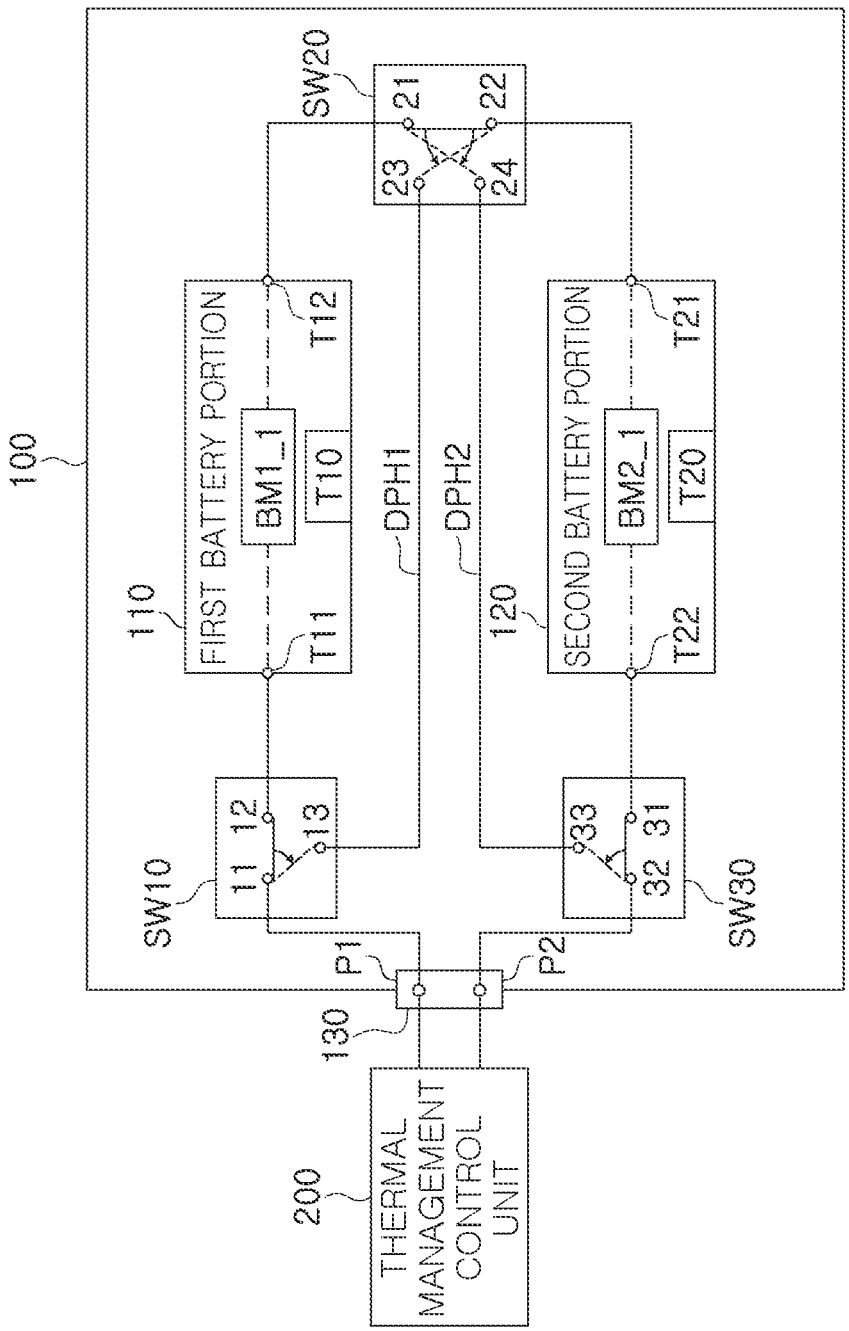
FIG. 7 is an exemplary configuration diagram of a first switch, a second switch, and a third switch.

FIG. 7 is an exemplary configuration diagram of the first switch, the second switch, and the third switch.

Referring to FIG. 7, the first switch SW10 may include a first terminal 11, a second terminal 12, and the first bypass terminal 13.

For example, the first terminal 11 of the first switch SW10 may be a common terminal connected to the first power terminal P1 of the connector 130, and may be a terminal to be connected to either the second terminal 12 or first bypass terminal 13 of the first switch SW10 based on the first control signal SC10 (in FIG. 3). The second terminal 12 of the first switch SW10 may be a terminal connected to a first terminal T11 of the first battery portion 110, and may or may not be connected to the first terminal 11 which is the common terminal of the first switch SW10. In addition, the first bypass terminal 13 of the first switch SW10 may be a terminal connected to one end of the first bypass path DPH1, and may or may not be connected to the first terminal 11 which is the common terminal of the first switch SW10.

The second switch SW20 may include a first terminal 21, a second terminal 22, the second bypass terminal 23, and the third bypass terminal 24.

For example, the first terminal 21 of the second switch SW20 may be a terminal connected to a second terminal T12 of the first battery portion 110, and may be connected to the second terminal 22 or third bypass terminal 24 of the second switch SW20 based on the second control signal SC20 (in FIG. 3). The second terminal 22 of the second switch SW20 may be a terminal connected to a first terminal T21 of the second battery portion 120, and may be connected to the first terminal 21 or second bypass terminal 23 of the second switch SW20. The second bypass terminal 23 of the second switch SW20 may be a terminal connected to the other end of the first bypass path DPH1, and may or may not be connected to the second terminal 22 of the second switch SW20. In addition, the third bypass terminal 24 of the second switch SW20 may be a terminal connected to one end of the second bypass path DPH2, and may or may not be connected to the first terminal 21 of the second switch SW20.

The third switch SW30 may include a first terminal 31, a second terminal 32, and the fourth bypass terminal 33.

For example, the first terminal 31 of the third switch SW30 may be a terminal connected to a second terminal T22 of the second battery portion 120, and may or may not be connected to the second terminal 32 of the third switch SW30 based on the third control signal SC30 (in FIG. 3). The second terminal 32 of the third switch SW30 may be a terminal connected to the second power terminal P2 of the connector 130, and may be connected to the first terminal 31 or fourth bypass terminal 33 of the third switch SW30. In addition, the fourth bypass terminal 33 of the third switch SW30 may be a terminal connected to the other end of the second bypass path DPH2, and may or may not be connected to the second terminal 32 of the third switch SW30.

Figure 8:
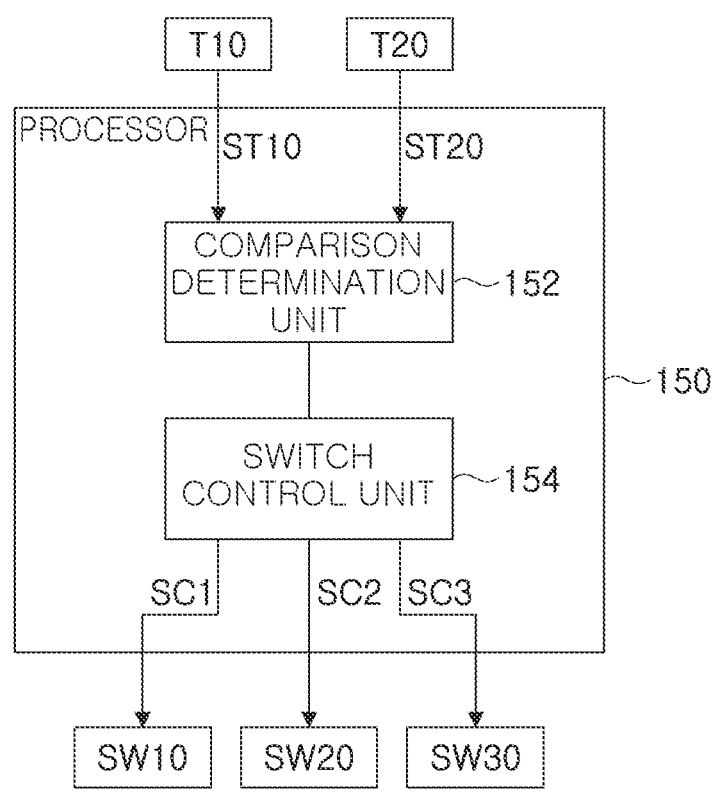
FIG. 8 is an exemplary view of the internal configuration and operation of a processor.

FIG. 8 is an exemplary view of the internal configuration and operation of the processor.

Referring to FIG. 8, the processor 150 may include a comparison determination unit 152 and a switch control unit 154.

The comparison determination unit 152 may compare a reference temperature STref with each of a first sensing temperature ST10 from the first temperature sensor unit T10 and a second sensing temperature ST20 from the second temperature sensor unit T20, and determine whether the battery abnormality corresponding to temperature abnormality occurs in the first battery portion 110 or in the second battery portion 120.

For example, the comparison determination unit 152 may determine that the battery abnormality occurs in the first battery portion 110 when the first sensing temperature ST10 is more than the reference temperature STref, or determine that the battery abnormality occurs in the second battery portion 120 when the second sensing temperature ST20 is more than the reference temperature STref.

The switch control unit 154 may generate the first control signal SC10, the second control signal SC20, and the third control signal SC30 to control a power supply path for supplying power to the thermal management control unit 200 based on the first battery portion 110 and whether the battery abnormality occurs in each of the first battery portion 110 and the second battery portion 120.

In the present disclosure, each of the comparison determination unit 152 and the switch control unit 154 may be implemented as hardware or software in at least one integrated circuit (IC) embedded in the processor 150, and is not limited to any specific one.

In addition, each of the comparison determination unit 152 and the switch control unit 154) may be implemented as an individual processor, or may be implemented as an integrated processor, and is not limited to any specific one.

Figure 9:
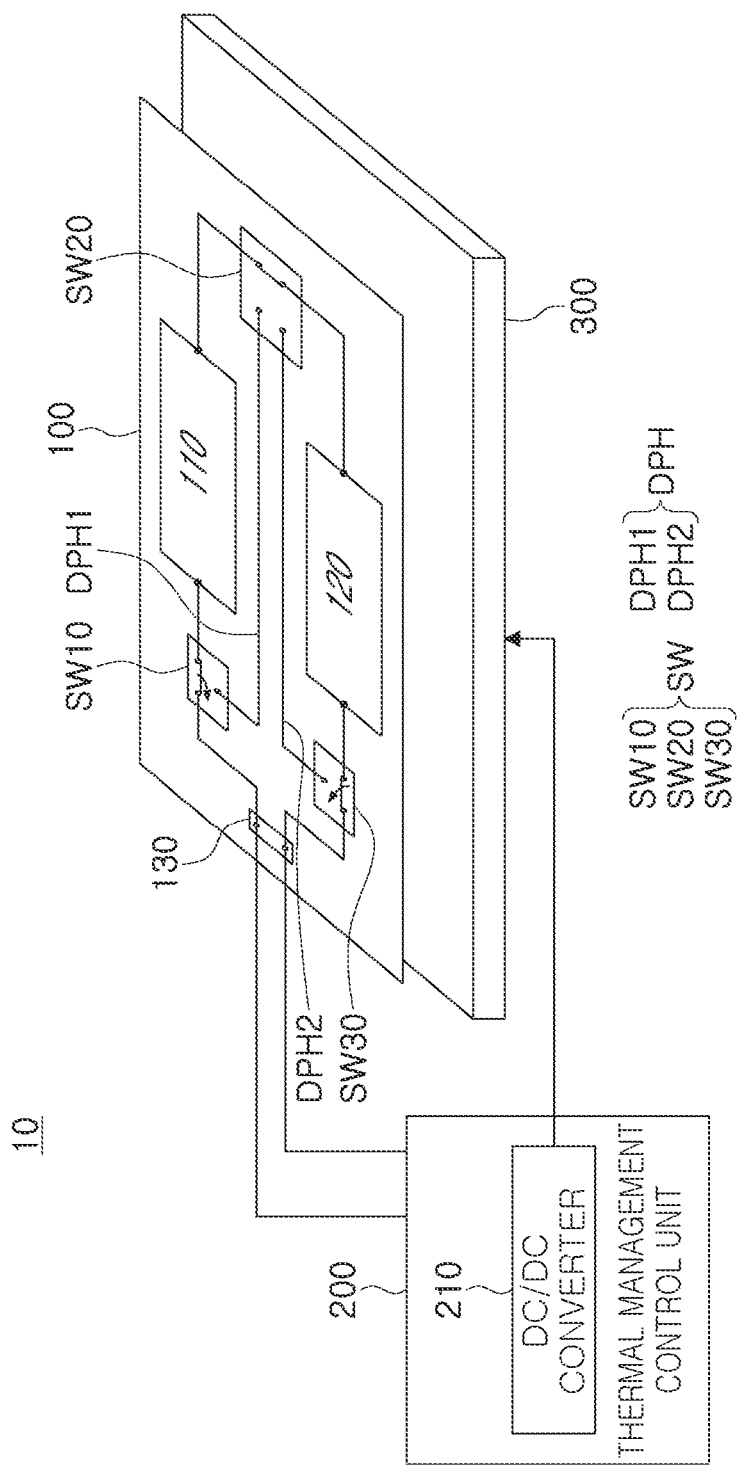
FIG. 9 is an exemplary view of a configuration arrangement of the vehicle battery pack system.

FIG. 9 is an exemplary view of a configuration arrangement of the vehicle battery pack system.

Referring to FIG. 9, the vehicle battery pack system 10 may include the vehicle battery pack 100, the thermal management control unit 200, and the cooling device 300, as described above.

The vehicle battery pack 100 may be any one of the exemplary embodiments described with reference to FIGS. 1 through 8, and a redundant description of the vehicle battery pack 100 is thus omitted.

The thermal management control unit 200 may include a direct current to direct current (DC/DC) converter 210, and the DC/DC converter 210 may generate the driving voltage of the cooling device 300 by using power supplied through the connector 130, and may supply the same to the cooling device 300.

The cooling device 300 may be driven by the driving voltage supplied from the thermal management control unit 200 and may cool a battery device 100.

For example, the cooling device 300 may adopt at least one of existing cooling methods such as a water cooling method, an air cooling method, and a heat exchange method.

Figure 10:
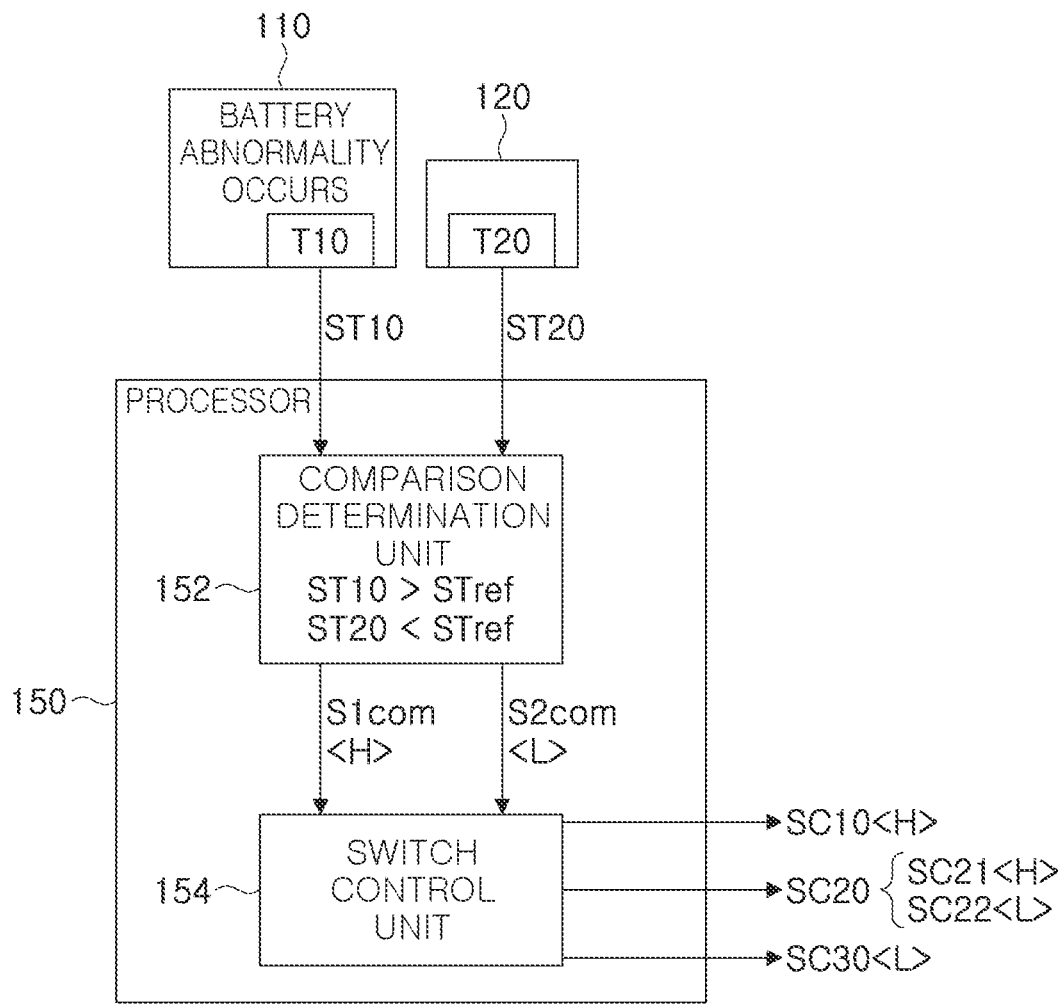
FIG. 10 is a view illustrating the operation of the processor when battery abnormality occurs in the first battery portion.

FIG. 10 is a view illustrating the operation of the processor when the battery abnormality occurs in the first battery portion, and FIG. 11 is a view illustrating an operation of the vehicle battery pack when the battery abnormality occurs in the first battery portion.

Referring to FIG. 10, for example, the battery abnormality may occur in the first battery portion 110. In this case, the comparison determination unit 152 may determine that the first sensing temperature ST10 from the first temperature sensor unit T10 of the first battery portion 110 is higher than the reference temperature STref, and output a first comparison signal S1com of a high level H and a second comparison signal S2com of a low level L.

Referring to FIG. 11, the switch control unit 154 may output the first control signal SC10, the second control signal SC20, and the third control signal SC30 for the first switch SW10, the first bypass path DPH1, the second switch SW20, the second battery portion 120, and the third switch SW30 to be connected to one another when the battery abnormality occurs in the first battery portion 110.

For example, the switch control unit 154 may output the first control signal SC10 of the high level H, the control signal SC21 of the high level H and control signal SC22 of the low level L of the second control signal SC20, and the third control signal SC30 of the low level L.

The first terminal 11 of the first switch SW10 may be connected to the first bypass terminal 13 based on the first control signal SC10<H> of the switch control unit 154, the second terminal 22 of the second switch SW20 may be connected to the second bypass terminal 23 based on the control signal SC21<H> of the second control signal SC20, and the first terminal 31 of the third switch SW30 may be connected to the second terminal 32 based on the third control signal SC30<L>.

Based on these operations of the first, second and the third switches SW10, SW20, and SW30, the first power terminal P1 of the connector 130 may be connected to the second power terminal P2 of the connector 130 through the first switch SW10, the first bypass path DPH1, the second switch SW20, the second battery portion 120, and the third switch SW30, thereby forming a power circuit including the second battery portion 120 around the connector 130.

Accordingly, driving power may be supplied to the thermal management control unit 200 by using the second battery portion 120 even when the battery abnormality occurs in the first battery portion 110.

Figure 12:
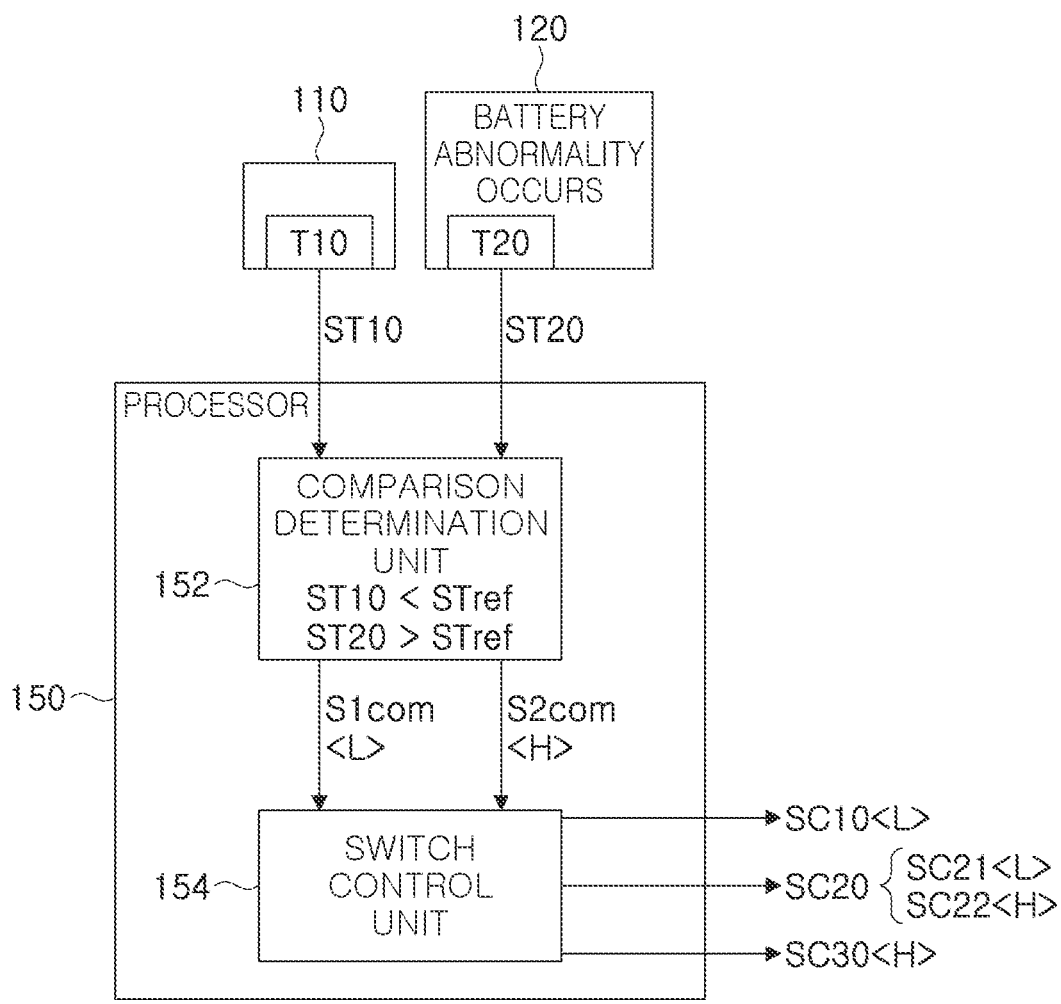
FIG. 12 is a view illustrating the operation of the processor when the battery abnormality occurs in the second battery portion.

FIG. 12 is a view illustrating the operation of the processor when the battery abnormality occurs in the second battery portion, and FIG. 13 is a view illustrating the operation of the vehicle battery pack when the battery abnormality occurs in the second battery portion.

Referring to FIG. 12, for example, the battery abnormality may occur in the second battery portion 120. In this case, the comparison determination unit 152 may determine that the second sensing temperature ST20 from the second temperature sensor unit T20 of the second battery portion 120 is higher than the reference temperature STref, and output the second comparison signal S2com of the high level H and the first comparison signal S1com of the low level L.

Referring to FIG. 13, the battery abnormality may occur in the second battery portion 120. In this case, the switch control unit 154 may output the first control signal SC10, the second control signal SC20, and the third control signal SC30 for the first switch SW10, the first battery portion 110, the second switch SW20, the second bypass path DPH2, and the third switch SW30 to be connected to one another.

For example, the switch control unit 154 may output the first control signal SC10 of the low level L, the control signal SC21 of the low level L and control signal SC22 of the high level H of the second control signal SC20, and the third control signal SC30 of the high level H.

The first terminal 11 of the first switch SW10 may be connected to the second terminal 12 based on the first control signal (SC10)<L> of the switch control unit 154, the first terminal 21 of the second switch SW20 may be connected to the third bypass terminal 24 based on the control signal SC22<H> of the second control signal SC20, and the second terminal 32 of the third switch SW30 may be connected to the fourth bypass terminal 33 based on the third control signal SC30<H>.

Based on these operations of the first, second and the third switches SW10, SW20, and SW30, the first power terminal P1 of the connector 130 may be connected to the second power terminal P2 of the connector 130 through the first switch SW10, the first battery portion 110, the second switch SW20, the second bypass path DPH2, and the third switch SW30, thereby forming a power circuit including the first battery portion 110 around the connector 130.

Accordingly, the driving power may be supplied to the thermal management control unit 200 by using the first battery portion 110 even when the battery abnormality occurs in the second battery portion 120.

In the present disclosure, the levels of the plurality of comparison signals and the levels of the plurality of control signals are only examples, are not limited to the examples.

Each level of the plurality of comparison signals and the plurality of control signals may be a voltage level, and is not limited thereto.

As set forth above, according to the exemplary embodiments of the present disclosure, it is possible to stably supply power to the cooling device by allowing the power path for supplying power to the cooling device to bypass the corresponding battery portion determined to have the battery abnormality when the battery abnormality such as the high temperature is determined to occur in any one of at least two battery portions including at least one battery module.

Accordingly, it is possible to delay or prevent the occurrence of fire due to the heat occurrence by stably supplying power for the battery cooling even when the battery abnormality occurs in any one of at least two battery portions.

While the exemplary embodiments have been shown and described above, it will be apparent to those skilled in the art that modifications and variations could be made without departing from the scope of the present disclosure as defined by the appended claims.

What is claimed is:

1. A vehicle battery pack comprising:
a first battery portion including a first battery module;
a second battery portion including a second battery module;
a connector supplying power from at least one of the first battery portion and the second battery portion when no battery abnormality has occurred to a thermal management control unit;
a bypass path unit providing a path to bypass any one of the first battery portion and the second battery portion when a battery abnormality has occurred; and a switching unit connecting the bypass path unit to the first or second battery portion when the battery abnormality has occurred, in a power supply circuit including the first battery portion and the second battery portion, connected to the connector, to supply power to the thermal management control unit, wherein the bypass path unit includes a first bypass path providing a path to bypass the first battery portion, and, the switching unit includes a first switch connecting one end of the connector to the first battery portion or the first bypass path, wherein the first switch includes a first terminal connected to a first power terminal of the connector, a second terminal connected to a first terminal of the first battery portion, and a first bypass terminal connected to one end of the first bypass path, and under control of a processor, the first terminal of the first switch is connected to the second terminal of the first switch when the battery is normal, and the first terminal of the first switch is connected to the first bypass terminal of the first switch when the battery abnormality occurs in the first battery portion.

2. The battery pack of claim 1, wherein the first battery portion includes a first temperature sensor unit detecting a temperature of the first battery module, and a second battery portion includes a second temperature sensor unit detecting a temperature of the second battery module.

3. The battery pack of claim 2, wherein the bypass path unit includes a second bypass path providing a path to bypass the second battery portion.

4. The battery pack of claim 3, wherein the switching unit includes a second switch connecting the first battery portion to the second battery portion, and connecting the first battery portion to the second bypass path, or connecting the second battery portion to the first bypass path, when the battery abnormality occurs, and a third switch connecting the other end of the connector to the second battery portion or the second bypass path.

5. The battery pack of claim 4, wherein the processor determines the battery abnormality based on a first sensing temperature from the first temperature sensor unit and a second sensing temperature from the second temperature sensor unit, and controls the first switch, the second switch, and the third switch to bypass the first battery portion or the second battery portion when the battery abnormality occurs.

6. The battery pack of claim 2, wherein the first temperature sensor unit includes a plurality of temperature sensors respectively detecting temperatures of a plurality of first battery modules when the first battery portion includes the plurality of first battery modules.

7. The battery pack of claim 2, wherein the second temperature sensor unit includes a plurality of temperature sensors respectively detecting temperatures of a plurality of second battery modules when the second battery portion includes the plurality of second battery modules.

8. The battery pack of claim 4, wherein the second switch includes a first terminal connected to a second terminal of the first battery portion, a second terminal connected to a first terminal of the second battery portion, a second bypass terminal connected to the other end of the first bypass path, and a third bypass terminal connected to one end of the second bypass path, and under control of the processor, the first terminal of the second switch is connected to the second terminal of the second switch when the battery is normal, and the first terminal of the second switch is connected to the third bypass terminal of the second switch, or the second terminal of the second switch is connected to a second bypass terminal of the second switch, when the battery abnormality occurs.

9. The battery pack of claim 4, wherein the third switch includes a first terminal connected to a second terminal of the second battery portion, a second terminal connected to a second power terminal of the connector, and a fourth bypass terminal connected to the other end of the second bypass path, and under control of the processor, the first terminal of the third switch is connected to the second terminal of the third switch when the battery is normal, and the second terminal of the third switch is connected to the fourth bypass terminal of the third switch when the battery abnormality occurs in the second battery portion.

10. The battery pack of claim 5, wherein the processor includes a comparison determination unit comparing a reference temperature with each of the first sensing temperature from the first temperature sensor unit and the second sensing temperature from the second temperature sensor unit, and determining whether the battery abnormality corresponding to temperature abnormality occurs in the first battery portion or in the second battery portion, and a switch control unit generating a first control signal, a second control signal, and a third control signal to control a battery power supply path for supplying power to the thermal management control unit based on whether the battery abnormality occurs in each of the first battery portion and the second battery portion.

11. The battery pack of claim 10, wherein the switch control unit outputs the first control signal, the second control signal, and the third control signal for the first switch, the first bypass path, the second switch, the second battery portion, and the third switch to be connected to one another, except for the first battery portion, and supplies power from the second battery portion to the thermal management control unit through the connector, when the battery abnormality occurs in the first battery portion.

12. The battery pack of claim 10, wherein the switch control unit outputs the first control signal, the second control signal, and the third control signal for the first switch, the first battery portion, the second switch, the second bypass path, and the third switch to be connected to one another, except for the second battery portion, and supplies power from the first battery portion to the thermal management control unit through the connector, when the battery abnormality occurs in the second battery portion.

13. A vehicle battery pack system comprising:
a vehicle battery pack;
a thermal management control unit receiving power through a connector of the vehicle battery pack and generating a driving voltage for cooling the vehicle battery pack; and
a cooling device disposed on at least one side of the vehicle battery pack and operated by receiving the driving voltage from the thermal management control unit to cool the vehicle battery pack,
wherein the vehicle battery pack includes
a first battery portion including a first battery module,
a second battery portion including a second battery module,
a connector supplying power from at least one of the first battery portion and the second battery portion when no battery abnormality has occurred to a thermal management control unit,
a bypass path unit providing a path to bypass any one of the first battery portion and the second battery portion when a battery abnormality has occurred, and
a switching unit connecting the bypass path unit to the first or second battery portion when the battery abnormality has occurred, in a power supply circuit including the first battery portion and the second battery portion, connected to the connector, to supply power to the thermal management control unit,
wherein the bypass path unit includes
a first bypass path providing a path to bypass the first battery portion, and,
the switching unit includes
a first switch connecting one end of the connector to the first battery portion or the first bypass path,
wherein the first switch includes
a first terminal connected to a first power terminal of the connector,
a second terminal connected to a first terminal of the first battery portion, and
a first bypass terminal connected to one end of the first bypass path, and
under control of a processor, the first terminal of the first switch is connected to the second terminal of the first switch when the battery is normal, and the first terminal of the first switch is connected to the first bypass terminal of the first switch when the battery abnormality occurs in the first battery portion.

14. The system of claim 13, wherein the first battery portion includes a first temperature sensor unit detecting a temperature of the first battery module, and
a second battery portion includes a second temperature sensor unit detecting a temperature of the second battery module.

15. The system of claim 14, wherein the bypass path unit includes
a second bypass path providing a path to bypass the second battery portion.

16. The system of claim 15, wherein the switching unit includes
a second switch connecting the first battery portion to the second battery portion, and connecting the first battery portion to the second bypass path, or connecting the second battery portion to the first bypass path, when the battery abnormality occurs, and
a third switch connecting the other end of the connector to the second battery portion or the second bypass path.

17. The system of claim 16, wherein the processor determines the battery abnormality based on a first sensing temperature from the first temperature sensor unit and a second sensing temperature from the second temperature sensor unit, and
controls the first switch, the second switch, and the third switch to bypass the first battery portion or the second battery portion when the battery abnormality occurs.

18. The system of claim 14, wherein the first temperature sensor unit includes a plurality of temperature sensors respectively detecting temperatures of a plurality of first battery modules when the first battery portion includes the plurality of first battery modules.

19. The system of claim 14, wherein the second temperature sensor unit includes a plurality of temperature sensors respectively detecting temperatures of a plurality of second battery modules when the second battery portion includes the plurality of second battery modules.

* * * * *